(12) United States Patent
Kodim

(10) Patent No.: US 11,909,189 B1
(45) Date of Patent: Feb. 20, 2024

(54) FLEXIBLE WIRING CONDUIT

(71) Applicant: Jakub Kodim, Aventura, FL (US)

(72) Inventor: Jakub Kodim, Aventura, FL (US)

(*) Notice: Subject to any disclaimer, the term of this patent is extended or adjusted under 35 U.S.C. 154(b) by 0 days.

(21) Appl. No.: 17/839,572

(22) Filed: Jun. 14, 2022

(51) Int. Cl.
*H02G 3/04* (2006.01)

(52) U.S. Cl.
CPC ......... *H02G 3/0406* (2013.01); *H02G 3/0487* (2013.01)

(58) Field of Classification Search
CPC .... B60R 16/0207; H02G 3/0462; H02G 3/22; H02G 3/0437; H02G 3/263; H02G 3/28; H01B 17/301; H01B 17/34; H01B 13/0016; H01B 13/01254; H01B 7/00; H01B 7/0009; H01B 7/0045; H01B 7/02; H01B 7/04; H01B 7/0838; H01B 7/2825; H01B 7/292; H01B 7/36; H01B 11/1865; H01B 11/1873; H01B 15/00; H01B 5/14; H01B 7/0072; H01B 7/40
See application file for complete search history.

(56) References Cited

U.S. PATENT DOCUMENTS

| | | | | |
|---|---|---|---|---|
| 3,314,039 A | * | 4/1967 | Opper | A47L 9/246 439/191 |
| 3,657,508 A | * | 4/1972 | Studnick | B23K 1/0053 219/85.13 |
| 3,735,211 A | * | 5/1973 | Kapnias | H01L 23/10 228/175 |
| 3,773,628 A | * | 11/1973 | Misawa | H01L 23/49575 174/541 |
| 3,847,184 A | | 11/1974 | God | |
| 4,360,104 A | * | 11/1982 | Lang | A61M 16/08 206/820 |
| 4,573,715 A | * | 3/1986 | Armbruster | H02G 3/06 405/184.5 |
| 4,650,224 A | * | 3/1987 | Smith | E03F 1/008 285/376 |
| 4,737,236 A | * | 4/1988 | Perko | H01L 24/06 216/41 |
| 4,814,855 A | * | 3/1989 | Hodgson | H01L 24/50 174/262 |
| 5,160,811 A | * | 11/1992 | Ritzmann | H02G 3/0691 285/236 |

(Continued)

FOREIGN PATENT DOCUMENTS

WO  2008148893  12/2008

*Primary Examiner* — Krystal Robinson
(74) *Attorney, Agent, or Firm* — Kyle A. Fletcher, Esq.

(57) ABSTRACT

The flexible wiring conduit is a hollow structure. The flexible wiring conduit forms a protected space that contains the cable. The flexible wiring conduit protects a cable from damage by forces that are exterior to the protected space formed by the flexible wiring conduit. The cable inserts through the protected space. The flexible wiring conduit is a composite prism structure. The flexible wiring conduit is a bimodal flexible structure. The bimodal flexible structure of the flexible wiring conduit allows the flexible wiring conduit to bent to follow a desired cabling path. The flexible wiring conduit incorporates a plurality of end fittings, a plurality of rigid tube structures, and a plurality of flexible tube structures. The plurality of end fittings, the plurality of rigid tube structures, and the plurality of flexible tube structures are interconnected to form the flexible wiring conduit.

12 Claims, 4 Drawing Sheets

(56) References Cited

U.S. PATENT DOCUMENTS

| | | | | |
|---|---|---|---|---|
| 5,435,962 A * | 7/1995 | Kramer, Jr. | ............... | F16L 11/11 |
| | | | | 264/507 |
| 5,789,815 A * | 8/1998 | Tessier | ................ | H01L 25/0652 |
| | | | | 257/E23.125 |
| 5,877,451 A * | 3/1999 | Zimmerman | ........ | H02G 3/0425 |
| | | | | 248/65 |
| 6,129,120 A * | 10/2000 | Margot | ................... | H02G 3/263 |
| | | | | 138/158 |
| 6,595,473 B2 * | 7/2003 | Aoki | .................. | B60R 16/0215 |
| | | | | 138/108 |
| 6,648,748 B1 * | 11/2003 | Ferlin | ...................... | F23J 11/02 |
| | | | | 454/67 |
| 9,616,826 B2 * | 4/2017 | Inao | ......................... | H02G 3/32 |
| 2004/0154817 A1 * | 8/2004 | Sudo | ................... | H02G 3/0418 |
| | | | | 174/481 |
| 2011/0056581 A1 | 3/2011 | Diels | | |
| 2012/0325360 A1 | 12/2012 | McGrath | | |
| 2015/0136482 A1 | 5/2015 | Adachi | | |
| 2015/0337997 A1 | 11/2015 | Sobrino | | |
| 2021/0249324 A1 * | 8/2021 | Wan | .................... | H01L 23/5386 |

* cited by examiner

FLEXIBLE WIRING CONDUIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of protective conduit for electric cables. (H02G 3/04)

Summary of Invention

The flexible wiring conduit is configured for use with a cable. The flexible wiring conduit is a hollow structure. The flexible wiring conduit forms a protected space that contains the cable. The flexible wiring conduit protects the cable from damage by forces that are exterior to the protected space formed by the flexible wiring conduit. The cable inserts through the protected space. The flexible wiring conduit is a composite prism structure. The flexible wiring conduit is a bimodal flexible structure. The bimodal flexible structure of the flexible wiring conduit allows the flexible wiring conduit to bent to follow a desired cabling path. The flexible wiring conduit comprises a plurality of end fittings, a plurality of rigid tube structures, and a plurality of flexible tube structures. The plurality of end fittings, the plurality of rigid tube structures, and the plurality of flexible tube structures are interconnected to form the flexible wiring conduit.

These together with additional objects, features and advantages of the flexible wiring conduit will be readily apparent to those of ordinary skill in the art upon reading the following detailed description of the presently preferred, but nonetheless illustrative, embodiments when taken in conjunction with the accompanying drawings.

In this respect, before explaining the current embodiments of the flexible wiring conduit in detail, it is to be understood that the flexible wiring conduit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flexible wiring conduit.

It is therefore important that the claims be regarded as including such equivalent construction insofar as they do not depart from the spirit and scope of the flexible wiring conduit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
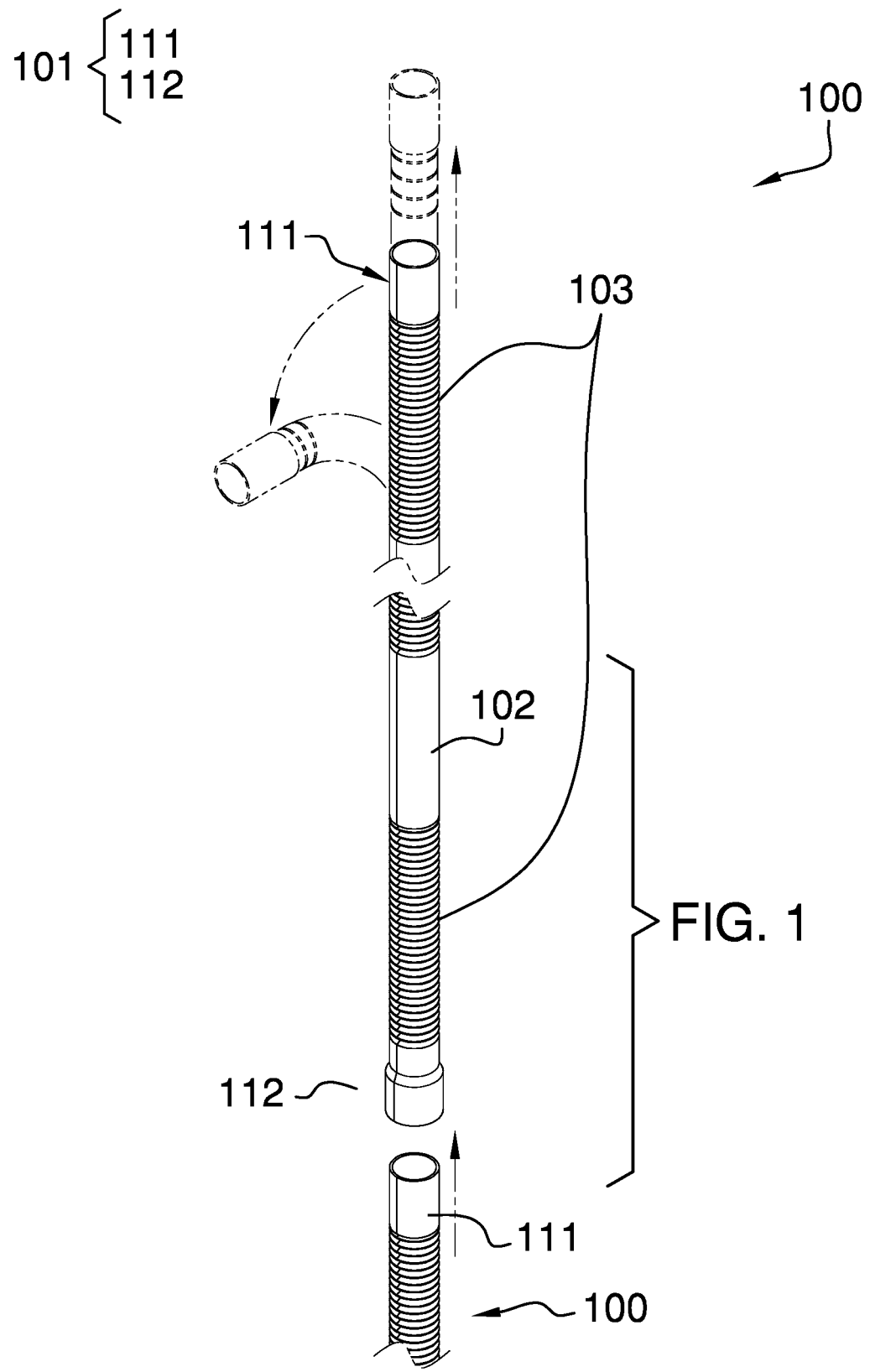
FIG. 1 is a perspective view of an embodiment of the disclosure.
Figure 2:
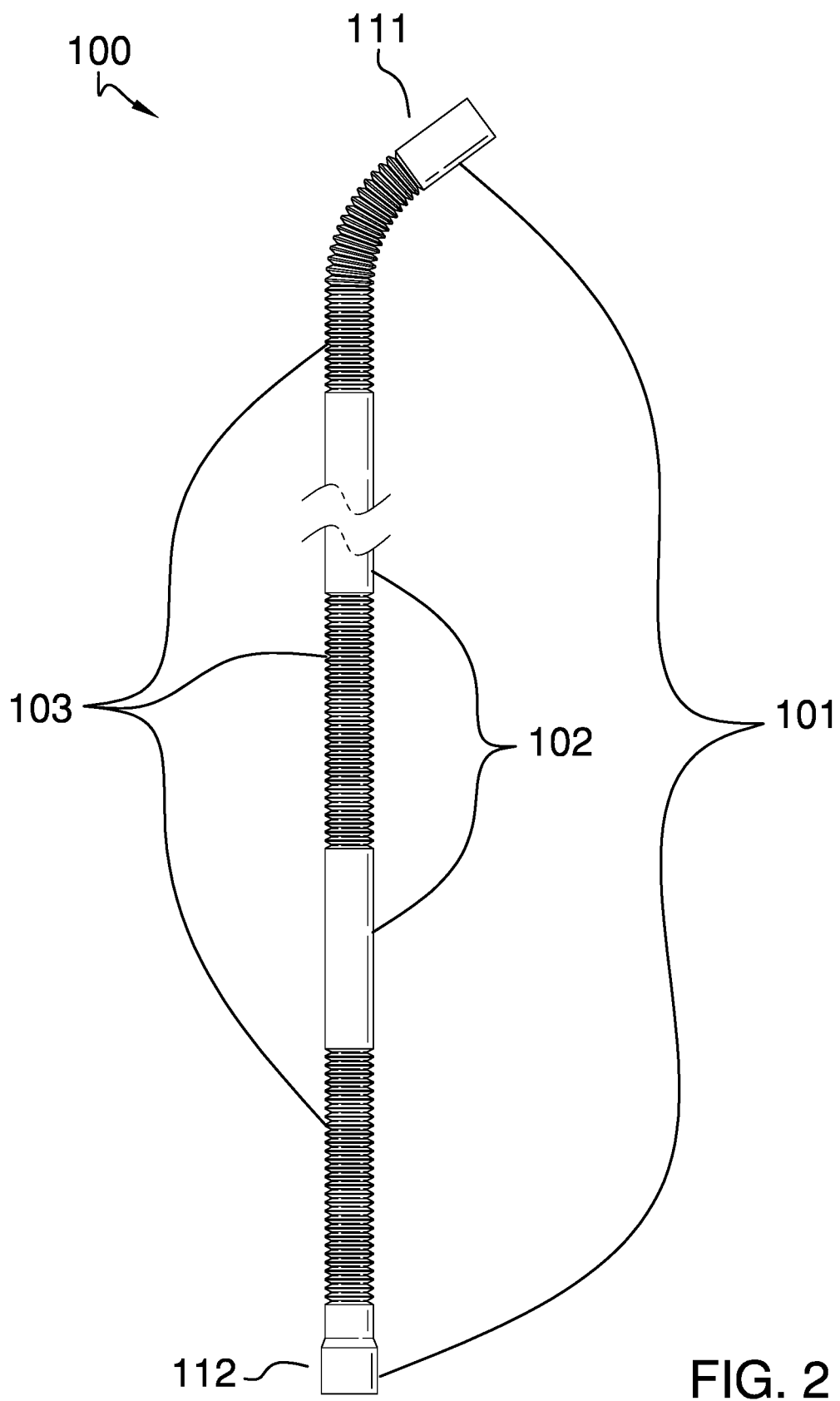
FIG. 2 is a front view of an embodiment of the disclosure.
Figure 3:
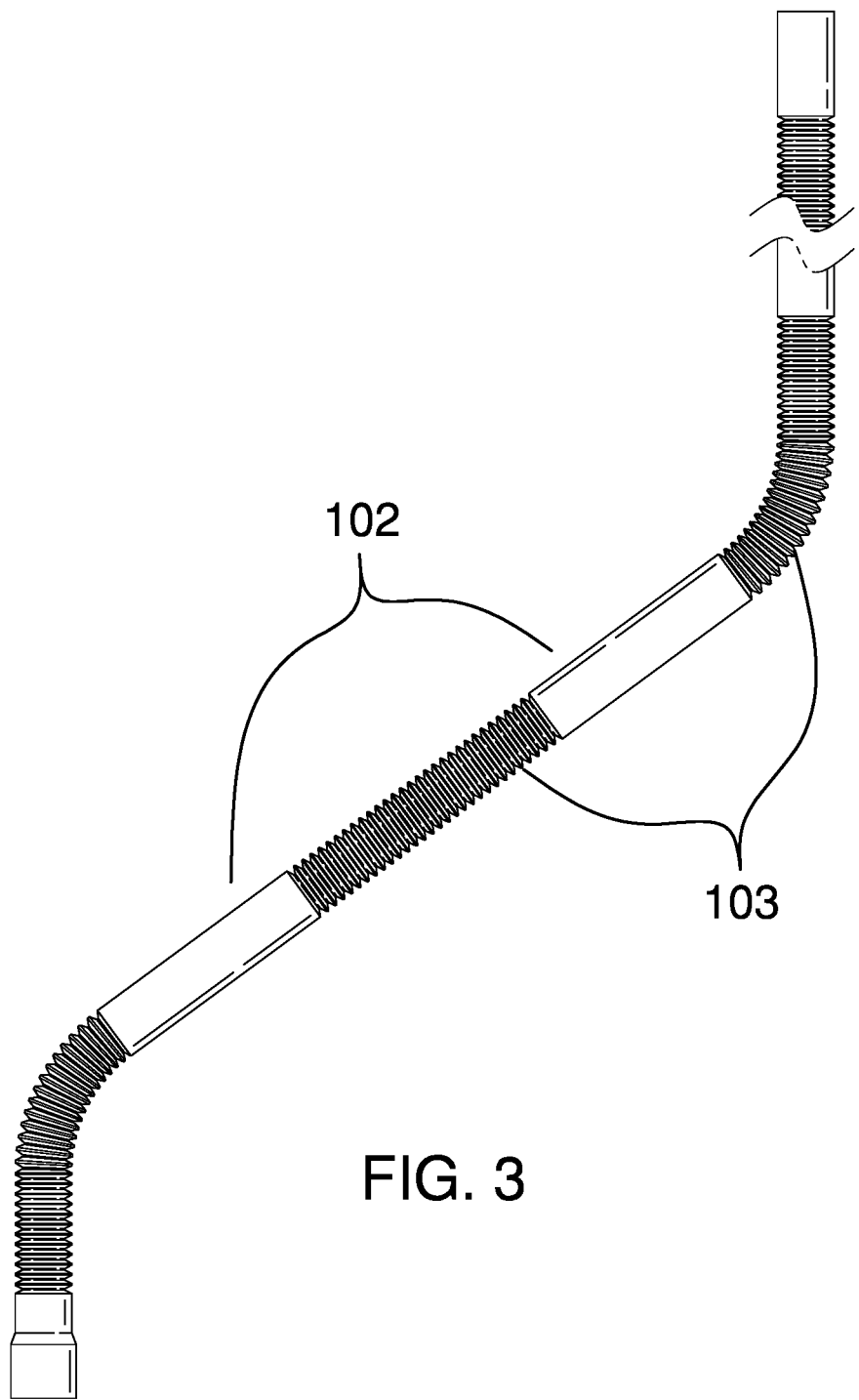
FIG. 3 is an in-use view of an embodiment of the disclosure.
Figure 4:
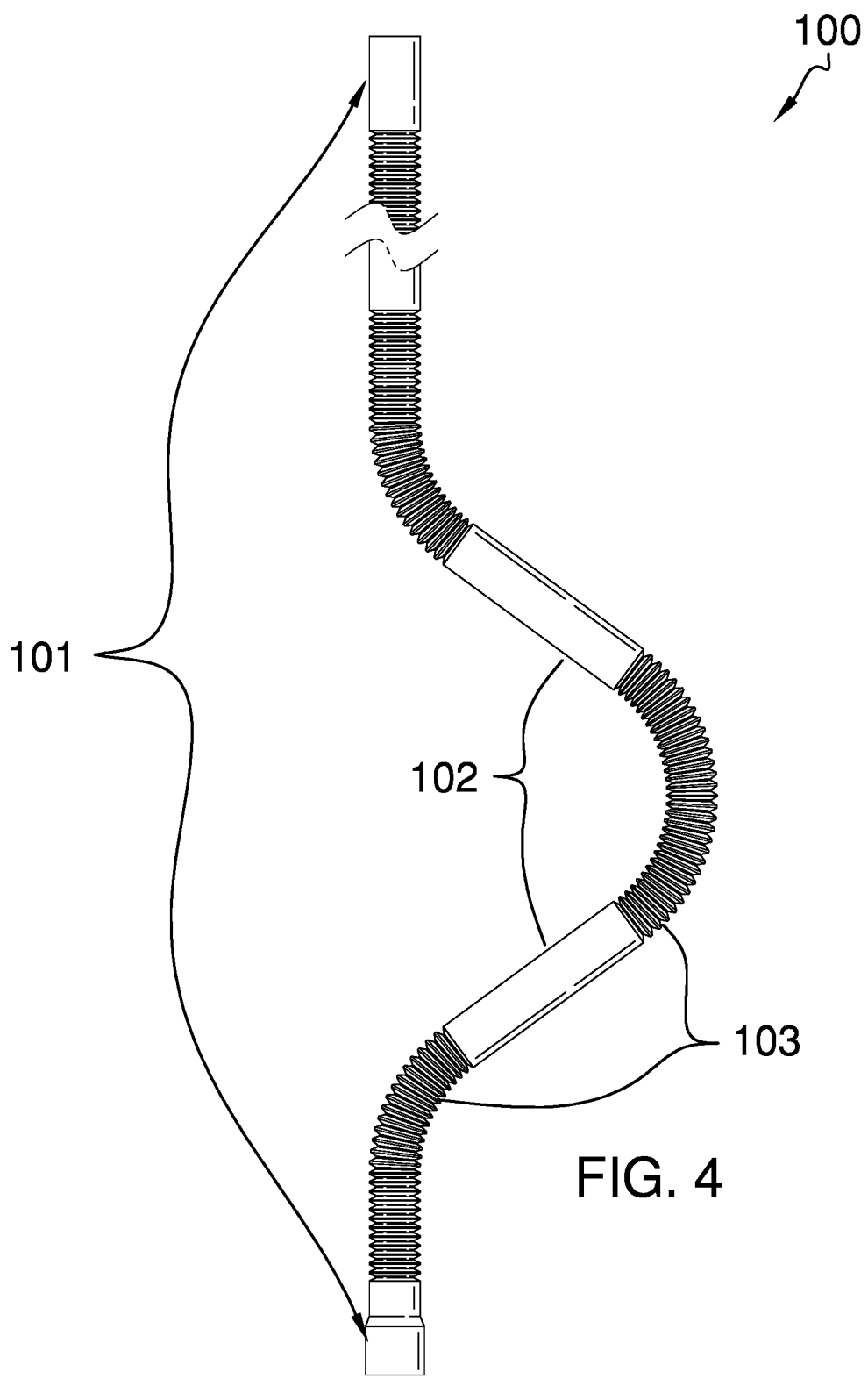
FIG. 4 is an in-use view of an embodiment of the disclosure.

Detailed reference will now be made to one or more potential embodiments of the disclosure, which are illustrated in FIGS. 1 through 4.

The flexible wiring conduit 100 (hereinafter invention) is configured for use with a cable. The invention 100 is a hollow structure. The invention 100 forms a protected space that contains the cable. The invention 100 protects the cable from damage by forces that are exterior to the protected space formed by the invention 100. The cable inserts through the protected space. The invention 100 is a composite prism structure. The invention 100 is a bimodal flexible structure. The bimodal flexible structure of the invention 100 allows the invention 100 to bent to follow a desired cabling path. The invention 100 comprises a plurality of end fittings 101, a plurality of rigid tube structures 102, and a plurality of flexible tube structures 103. The plurality of end fittings 101, the plurality of rigid tube structures 102, and the plurality of flexible tube structures 103 are interconnected to form the invention 100.

Each end fitting selected from the plurality of end fittings 101 is a fitting. Each selected end fitting forms a portion of a fastening device. Each selected end fitting interconnects a first instantiation of the invention 100 to a second instantiation of the invention 100.

Each end fitting selected from the plurality of end fittings 101 forms a congruent end of the composite prism structure of the invention 100.

Each selected end fitting attaches to a structure selected from the group consisting of an individual rigid tube structure selected from the plurality of rigid tube structures 102 and an individual flexible tube structure selected from the plurality of flexible tube structures 103. The selected end fitting and its associated structure are joined to form a composite prism structure.

Each end fitting selected from the plurality of end fittings 101 is a rigid structure. Each selected end fitting is a prism shaped structure. The selected end fitting is a Euclidean structure. The selected end fitting is a hollow structure.

The plurality of end fittings 101 comprises a male fitting 111 and a female fitting 112. The male fitting 111 is a fitting. The male fitting 111 forms a first congruent end of the composite prism structure of every instantiation of the invention 100. The female fitting 112 is a fitting. The female fitting 112 forms a second congruent end of the composite prism structure of every instantiation of the invention 100.

The female fitting 112 and the male fitting 111 combine to form a fastening structure. Specifically, the male fitting 111 inserts into the female fitting 112 to form a tight fit. The male fitting 111 snaps into the female fitting 112 to form a fastening device. The male fitting 111 of the composite prism structure of a first instantiation of the invention 100 inserts into the female fitting 112 of the composite prism structure of a second instantiation of the invention 100 to form a combined composite prism structure.

Each individual rigid tube structure selected from the plurality of rigid tube structures 102 is a rigid structure. Each selected individual rigid tube structure is a prism shaped structure. Each selected individual rigid tube structure is a Euclidean structure. Each selected individual rigid tube structure is a hollow structure. Each selected individual rigid tube structure has a tube shape.

Each congruent end of any selected individual rigid tube structure attaches to a structure selected from the group consisting of an end fitting selected from the plurality of end fittings 101 and an individual flexible tube structure selected from the plurality of flexible tube structures 103. The selected structure and its associated selected individual flexible tube structure are joined to form a composite prism structure.

In the first potential embodiment of the disclosure, a first selected individual rigid tube structure is never directly attached to a second selected individual flexible tube structure.

Each individual flexible tube structure selected from the plurality of flexible tube structures 103 is a bimodal flexible structure. The bimodal flexible structure is defined elsewhere in this disclosure. Each selected individual flexible tube structure is a prism shaped structure. The prism structure of the selected individual flexible tube structure is selected from the group consisting of: a) a Euclidean prism structure; and, b) a non-Euclidean structure.

Each selected individual flexible tube structure is a hollow structure. Each selected individual flexible tube structure has a tube shape. Each congruent end of any selected individual flexible tube structure attaches to a structure selected from the group consisting of an end fitting selected from the plurality of end fittings 101 and an individual rigid tube structure selected from the plurality of rigid tube structures 102. The selected structure and its associated selected individual rigid tube structure are joined to form a composite prism structure.

In the first potential embodiment of the disclosure, a first selected individual flexible tube structure is never directly attached to a second selected individual flexible tube structure.

Each individual flexible tube structure selected from the plurality of flexible tube structures 103 is an adjustable structure. By adjustable is meant that the form factor of each selected individual flexible tube structure bends such that the center axis of the prism structure of the selected individual flexible tube structure forms a non-Euclidean structure. By adjustable is further meant that the form factor of each selected individual flexible tube structure bends such that the center axis of the prism structure of the selected individual flexible tube structure forms a Euclidean structure.

The form factor of the invention 100 is adjusted to follow the desired cable path by adjusting the form factor of each selected individual flexible tube structure.

The span of the length of the center axis of the prism structure of each individual flexible tube structure selected from the plurality of flexible tube structures 103 is adjustable. The lateral face of the prism structure of the selected individual flexible tube structure is formed as an accordion joint that allows for the extension of the span of the center axis of the selected individual flexible tube structure.

The following definitions were used in this disclosure:

Accordion Fold: As used in this disclosure, an accordion fold is a corrugated structure that resembles the bellows of an accordion.

Accordion Joint: As used in this disclosure, an accordion joint is a fitting that joins a first fluid transport structure, such as a pipe, to a second fluid transfer structure, such as a pipe. The accordion joint is a prism-shaped tubular structure that allows a fluid to flow between the first fluid transport structure and the second fluid transport structure. The lateral face of the prism structure accordion joint is formed with an accordion fold such that the accordion joint is a flexible structure. By flexible is meant that the span of the length of the center axis of the accordion joint is adjustable. By flexible is further meant that the curvature of the center axis of the accordion joint is adjustable.

Adjustable: As used in this disclosure, the term adjustable refers to the ability of a structure or device to change its fit (or form factor), appearance, input requirements, or its output to meet the needs of a situation.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Armor: As used in this disclosure, armor refers to a rigid structure used to form a guard that creates a protected space.

Barrier: As used in this disclosure, a barrier is a physical obstacle that forms a boundary between a first space and a second space. The barrier prevents the passage of an object between the first space and the second space.

Bend: As used in this disclosure, to bend means to apply a deforming force to an object such that the cant or curvature of the deformed object is changed.

Bimodal Flexible Structure: As used in this disclosure, a bimodal flexible structure is a structure that: a) responds to forces that are applied to one or more dimensional axes of the bimodal flexible structure in the manner of a rigid structure; while, b) simultaneously responding to forces that are applied to a dimensional axis that is perpendicular to the one or more dimensional axes described in (a) in the manner of a semi-rigid structure with an inelastic nature. A conduit structure is an example of a bimodal flexible structure. Specifically, a conduit structure acts as a rigid structure to forces that are applied in a radial direction towards the center axis of the prism structure of the conduit structure while being allowing the prism structure of the conduit to bend such that the conduit can be shaped into a non-Euclidean prism. A drafting spline is another example of a bimodal flexible structure. The resistance of a wire to compressive forces along the center axis of the wire allows a wire to behave as a bimodal flexible structure.

Cable: As used in this disclosure, a cable is a collection of one or more insulated wires covered by a protective casing that is used for transmitting electricity or telecommunication signals.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Conduit Structure: As used in this disclosure, a conduit structure is an armor structure. The armor structure formed by the conduit structure protects the hollow interior of the conduit structure. The conduit structure forms a flexible hollow tubular prism-shaped structure. The conduit structure is a composite prism structure formed from a plurality of rigid tubular structures. Any first rigid tubular structure selected from the plurality of rigid tubular structures inserts into a second rigid tubular structure such that the second rigid tubular structure rotates relative to the first rigid tubular structure in a manner that allows a cant to be formed between the center axis of the first rigid tubular structure and the center axis of the second rigid tubular structure. Each of the plurality of rigid tubular structures are assembled as a daisy chain in the manner described above. The rigid nature of each of the plurality of rigid tubular structures protects the interior structure of conduit structure from radial forces that are applied directly to any rigid tubular structure selected from the plurality of rigid tubular structures. The ability any two rigid tubular structures selected from the plurality of rigid tubular structures to rotate relative to each other provides the conduit with a flexible nature that allows the conduit structure to form a non-Euclidean prism structure by curving the center axis of the composite prism structure. The conduit structure is considered a flexible structure with an inelastic nature. The modulus of deformation of the flexible nature of the conduit structure is controlled by controlling the friction caused by the rotation of the second rigid tubular structure within the first rigid tubular structure. The conduit structure is an example of a bimodal flexible structure.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Corrugated: As used in this disclosure, the term corrugated describes a structure that is formed with a series of parallel and alternating ridges and grooves.

Curve or Curvature: As used in this disclosure, a curve refers to a continuous line that is not a straight line or a continuous surface that is not a planar surface. By continuous is meant that the continuous line or surface changes smoothly over one or more independent variables. Alternately, continuous can be taken to mean that a single valued derivative with respect to any independent variable exists for all points on the curved line or curved surface. A note on usage: within this disclosure, when a prism is said to be curved, what will be meant is that the center axis of the prism is curved. The discontinuities inherent in the ends of the prism will continue to exist in the lateral face of the curved prism.

Daisy Chain: As used in this disclosure, daisy chain is a term that describes a series of objects that are linked together in a linear fashion. When referring to an electrical circuit, a daisy chain refers to a collection of electrical circuits interconnected using a series circuit.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Extend: As used in this disclosure, to extend takes a meaning selected from the group consisting of: a) increasing the reach of a line that connects a first object to a second object; and, b) increasing the amount of time available for the completion of a task.

Exterior: As used in this disclosure, the exterior is used as a relational term that implies that an object is not contained within the boundary of a structure or a space.

Fitted: As used in this disclosure, the term fitted refers to two geometrically similar structures wherein the smaller geometrically similar structure inserts into the larger geometrically similar structure.

Fitting: As used in this disclosure, a fitting is a component that attaches a first object to one or more additional objects. The fitting is often used to forming a fluidic connection between the first object and the one or more additional objects.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Inelastic Nature: As used in this disclosure, an inelastic nature refers to a flexible structure that maintains its new shape after the flexible structure has been deformed.

Instantiation: As used in this disclosure, an instantiation refers to a specific physical object or process that is created using a specification.

Interior: As used in this disclosure, the interior is used as a relational term that implies that an object is contained within the boundary of a structure or a space.

Negative Space: As used in this disclosure, negative space is a method of defining an object through the use of open or empty space as the definition of the object itself, or, through the use of open or empty space to describe the boundaries of an object.

Non-Euclidean Line: A non-Euclidean line is a line that is formed with a curvature. Specifically, a non-Euclidean line comprises a set of points wherein the path of the span of the shortest distance between at least two points selected from the line does not lie on the path of the line itself. When a non-Euclidean line forms a section of the perimeter of a structure, the non-Euclidean line is often called a non-Euclidean edge.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; protects the object within the protected space from potential dangers that are outside of the protected space; or, d) maintaining the privacy of the object within the protected space.

Radial: As used in this disclosure, the term radial refers to a direction that: 1) is perpendicular to an identified central axis; or, 2) projects away from a center point.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Snap: As used in this disclosure, a snap is a fastener that comprises a first component and a second component. The snap is engaged by inserting the first component into the second component. The first component and the second component of the snap are often referred to as the male component into the female component.

Tight Fit: As used in this disclosure, a tight fit refers to the insertion of a first object into a second object such that there is not a lot of space between the first object and the second object. By not a lot of space is meant that friction occurs when the first object moves within the second object.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A flexible wiring conduit comprising
a plurality of end fittings, a plurality of rigid tube structures, and a plurality of flexible tube structures;
wherein the plurality of end fittings, the plurality of rigid tube structures, and the plurality of flexible tube structures are interconnected to form the flexible wiring conduit;
wherein each end fitting selected from the plurality of end fittings is a fitting;
wherein each selected end fitting forms a portion of a fastening device;
wherein each selected end fitting interconnects a first instantiation of the flexible wiring conduit to a second instantiation of the flexible wiring conduit;
wherein each end fitting selected from the plurality of end fittings forms a congruent end of the composite prism structure of the flexible wiring conduit;
wherein each selected end fitting attaches to a structure selected from the group consisting of an individual rigid tube structure selected from the plurality of rigid tube structures and an individual flexible tube structure selected from the plurality of flexible tube structures;
wherein the selected end fitting and its associated structure are joined to form a composite prism structure;
wherein the plurality of end fittings comprises a male fitting and a female fitting;
wherein the male fitting is a fitting;
wherein the male fitting forms a first congruent end of the composite prism structure of every instantiation of the flexible wiring conduit;
wherein the female fitting is a fitting;
wherein the female fitting forms a second congruent end of the composite prism structure of every instantiation of the flexible wiring conduit;
wherein the female fitting and the male fitting combine to form a fastening structure;
wherein specifically, the male fitting inserts into the female fitting to form a tight fit;
wherein the male fitting snaps into the female fitting to form a fastening device;
wherein the male fitting of the composite prism structure of a first instantiation of the flexible wiring conduit inserts into the female fitting of the composite prism structure of a second instantiation of the flexible wiring conduit to form a combined composite prism structure;
wherein the flexible wiring conduit is configured for use with a cable;
wherein each end fitting selected from the plurality of end fittings is a rigid structure;
wherein each congruent end of any selected individual rigid tube structure attaches to a structure selected from the group consisting of an end fitting selected from the plurality of end fittings and an individual flexible tube structure selected from the plurality of flexible tube structures.

2. The flexible wiring conduit according to claim 1
wherein the flexible wiring conduit is a hollow structure;
wherein the flexible wiring conduit forms a protected space that contains the cable;
wherein the cable inserts through the protected space.

3. The flexible wiring conduit according to claim 2
wherein the flexible wiring conduit is a composite prism structure;
wherein the flexible wiring conduit is a bimodal flexible structure.

4. The flexible wiring conduit according to claim 3
wherein each selected end fitting is a prism shaped structure;
wherein the selected end fitting is a Euclidean structure;
wherein the selected end fitting is a hollow structure.

5. The flexible wiring conduit according to claim 4
wherein each individual rigid tube structure selected from the plurality of rigid tube structures is a rigid structure;
wherein each selected individual rigid tube structure is a prism shaped structure;
wherein each selected individual rigid tube structure is a Euclidean structure;
wherein each selected individual rigid tube structure is a hollow structure;
wherein each selected individual rigid tube structure has a tube shape.

6. The flexible wiring conduit according to claim 5
wherein the selected structure and its associated selected individual flexible tube structure are joined to form a composite prism structure.

7. The flexible wiring conduit according to claim 6
wherein each individual flexible tube structure selected from the plurality of flexible tube structures is a bimodal flexible structure.

8. The flexible wiring conduit according to claim 7
wherein each selected individual flexible tube structure is a prism shaped structure;
wherein the prism structure of the selected individual flexible tube structure is selected from the group consisting of: a) a Euclidean prism structure; and, b) a non-Euclidean structure.

9. The flexible wiring conduit according to claim 8
wherein each selected individual flexible tube structure is a hollow structure;
wherein each selected individual flexible tube structure has a tube shape.

10. The flexible wiring conduit according to claim 9
wherein each congruent end of any selected individual flexible tube structure attaches to a structure selected from the group consisting of an end fitting selected from the plurality of end fittings and an individual rigid tube structure selected from the plurality of rigid tube structures;
wherein the selected structure and its associated selected individual rigid tube structure are joined to form a composite prism structure.

11. The flexible wiring conduit according to claim 10
wherein each individual flexible tube structure selected from the plurality of flexible tube structures is an adjustable structure;
wherein by adjustable is meant that the form factor of each selected individual flexible tube structure bends such that the center axis of the prism structure of the selected individual flexible tube structure forms a non-Euclidean structure,
wherein by adjustable is further meant that the form factor of each selected individual flexible tube structure bends such that the center axis of the prism structure of the selected individual flexible tube structure forms a Euclidean structure.

12. The flexible wiring conduit according to claim 11
wherein the span of the length of the center axis of the prism structure of each individual flexible tube structure selected from the plurality of flexible tube structures is adjustable;
wherein the lateral face of the prism structure of the selected individual flexible tube structure is formed as an accordion joint that allows for the extension of the span of the center axis of the selected individual flexible tube structure.

* * * * *